United States Patent [19]

Hornig et al.

[11] Patent Number: 4,821,048
[45] Date of Patent: Apr. 11, 1989

[54] AREA EXPOSURE APPARATUS FOR EXPOSING AN AREA OF TEXT ON A RECORDING CARRIER AND METHOD FOR CONDUCTING THE AREA EXPOSURE

[75] Inventors: Klaus-Jurgen Hornig, Glashuetten; Hans-Henning Thiessen, Kelkheim, both of Fed. Rep. of Germany

[73] Assignee: Linotype Aktiengesellschaft, Eschborn, Fed. Rep. of Germany

[21] Appl. No.: 228,855

[22] Filed: Aug. 3, 1988

Related U.S. Application Data

[63] Continuation of Ser. No. 41,882, Apr. 23, 1987, abandoned.

[30] Foreign Application Priority Data

Apr. 30, 1986 [DE] Fed. Rep. of Germany ....... 3614645

[51] Int. Cl.⁴ .................... G01D 9/42; G03G 15/00
[52] U.S. Cl. .................................. 346/108; 358/302
[58] Field of Search ............ 354/7, 9, 10; 346/76 L, 346/108; 358/298, 302

[56] References Cited

U.S. PATENT DOCUMENTS 4,300,206 11/1981 Belleson et al. ............... 364/900
4,331,955 5/1982 Hansen ........................... 340/728
4,698,648 10/1987 Takahashi et al. .............. 346/108

FOREIGN PATENT DOCUMENTS

57-34285 2/1982 Japan .
58-78297 5/1983 Japan .

Primary Examiner—Michael L. Gellner

[57] ABSTRACT

An area exposure apparatus for exposing a text on a recording carrier and a method for the area exposure is disclosed. In accordance with the device configuration, text is exposed on a recording carrier (12) which continuously moved forward in a forward move direction. To this end, the recording carrier is scanned over a maximum area and consequently exposed by means of an intensity modulated laser beam along scanning lines (Z1, Z2) at right angles relative to the forward move direction, and coupled in a predetermined manner to the forward movement. The scanning lines formed by the scanning extend over a plurality of characters of the text. For the exposure of the recording carrier with a text which exceeds a given length to width ratio, and has a predetermined narrower width than the recording carrier, which is hence relatively narrow, the recording carrier (12) is shifted in the direction of the lines of the text and at the same time is scanned in the direction of the height of the characters of the text.

10 Claims, 4 Drawing Sheets

AREA EXPOSURE APPARATUS FOR EXPOSING AN AREA OF TEXT ON A RECORDING CARRIER AND METHOD FOR CONDUCTING THE AREA EXPOSURE

This application is a continuation of application Ser. No. 041,882, filed Apr. 23, 1987, now abandoned.

BACKGROUND OF THE INVENTION

This invention relates to an area exposure apparatus and method for exposing an area of text on a recording carrier. More specifically, the invention relates to a device and method which converts text data into signals useable by a scanner to expose the text on the recording carrier.

In this text, the term area exposure apparatus mounted together with a laser recorder is intended to means, as known to those of ordinary skill in this art, either laser printers which produce a final printed product or laser typesetting apparatus or devices, which produce a typeset product, i.e., a typographically typeset text, which has to be transferred by further techniques onto a printing mold, particularly, a printing plate. Laser printers and laser typesetting devices differ from each other essentially in that the latter typeset typographic characters with a high resolution than is possible with the laser printer is printing. As for the details of operation, the essential structures, of interest in the present case, are similar in laser printers as compared to laser typesetting devices.

Area exposure apparatuses of the type discussed above are generally characterized in that they do not build up the characters individually, one after the other, with the exposure of the individual characters being performed by means of a raster scan at right angles relative to the line direction of movement of a carrier being exposed. Instead, after the termination of a scan line, the recording carrier upon which the exposure is made is continuously moved in a forward move direction at right angles relative to the line direction, with this forward more direction being synchronized with the deflection movement of a scanner, and with the scanner scanning the recording carrier along horizontal scanning lines over the width of a plurality of characters, particularly of all the characters of a specified line of text.

Prior art area exposure apparatusses include as the scanner a polygon mirror, which rotates at a high speed of rotation and deflects an intensity-modulated scanner beam at right angles relative to the forward move direction of a recording carrier, i.e., a film. Between two subsequent scanning lines, the recording carrier is continuously transported to a given height. The deflection movement projection upon the recording carrier extends in this case over at least the so-called typesetting width which is scanned by the scanner beam and is image-wise exposed over a width corresponding to the text line to be exposed. In view of the high speed of the scanning movement and of the relatively high forward move speed, high typesetting speeds are obtained, for example, by a device such as commercially under the name "Linotron 600" from Linotype GmbH. This is at least true if the line width to be exposed is not substantially narrower than the typesetting width.

If, however, text columns have to be typeset which are narrow relative to the typesetting width, a large portion of the projected deflection movement extends needlessly over the recording carrier because during a great portion of the scanning movement, image-wise exposure does not take place. Because the forward movement of the recording carrier coupled to the scanning movement remains essentially constant, the same time is needed for the exposure of narrow lines as for the exposure of broad lines. In this case it is assumed that by means of an output data processing system of the area exposure apparatus, output data for the control of a modulator of the scanner beam from received text data and character-specific data is so rapidly generated and stored that the forward movement sychronized with the scanning movement need not be stopped even in case of great line widths of the text to be exposed. The generation of such output data which includes the modulation, or the switch-on or switch-off, of a scanner beam, respectively when scanning along the scanning lines, constitutes the general background state of the art such as disclosed German Patent Specification No. 2,940,897, the disclosure of which is specifically incorporated by reference herein, and according to which output data, so-called third digital data, giving the interfaces of the contour lines of a plurality of characters with one raster line, i.e., a scanner line, each are stored in the raster line storage buffer or buffers.

From these so-called third digital data, a video control signal is generated, which switches the scanner beam on and off by means of a modulator. The deflection of the beam for scanning the recording carrier is, in that case, performed by means of a resettable mirror which is moved, at an essentially constant angular velocity, in one direction whereupon the mirror is rapidly reset into the starting position and the scanning process is repeated after the next trigger pulse has been received.

In addition to the resultant relatively low typesetting speed when exposing narrow text columns with a constant typesetting width with continuous coupled movements of the scanner and of the drive means for the recording carriers forward move, the material of the recording carrier is made little use of if only one long column along one length section of the recording carrier is exposed.

It has therefore also been known to provide an area exposure apparatus of the kind mentioned above as the "Linotronic 600", with a converter, which converts the text data of a narrow text exceeding a given length to width ration into converted text data of a text occupying a larger width of the recording carrier. To this end, the text is segmented along section lines in the direction of the line, and the relatively short text segments are exposed, one next to the other, on the recording carrier. As a result, scanning and exposing is performed along a scanning line over the width of a greater number of characters. It is in this environment, however, that a disadvantage results in that, subsequently, the text segments have to be mounted together by hand. When relatively short text segments are concerned, the mounting work hinders obtaining the advantage of a higher exposure speed.

SUMMARY OF THE INVENTION

In accordance with the present invention there is developed an area exposure apparatus of the kind mentioned above which while using a high exposing speed (typesetting speed) and making good use of the recording carrier by the exposed text, also achieves elimination of subsequent mounting processes.

This problem is solved by the development of an area exposure apparatus which includes a converter for rotating text to be exposed on the recording carrier by about 90° relative to the normal position of text on the carrer. An essential advantage obtained by means of the area exposure apparatus according to the invention, is that the effective exposure speed, i.e., the number of exposed characters per time unit for a given typesetting job or a text of a given length, is increased and the light-sensitive recording carrier is made better use of. Further, in the case of text having a length smaller than the given typesetting width of the area exposure apparaus, subsequent mounting of the text segments is no longer necessary. If the length of the text exceeds the given typesetting width, it is possible to split up the text into segments and then expose only a relatively small number of segments in an orientation about 90° relative to the normal position of the text on the recording carrier and thus, the advantages relating to effective exposure speed mentioned in the foregoing is retained.

Another advantage of the area exposure apparatus according to the invention is that the construction of the prior art area exposure apparatus may be essentially retained and that only the structure or the mode of operation, respectively, of a few process modules of the area exposure apparatus has to be changed. More specifically, change need be made only in the converter for rotating the text to be exposed to the recording carrier about 90° relative to the normal position of the text as compared to known prior art devices. In this manner, the development is simplified, the possibility of a later conversion of existing area exposure apparatusses with the converter for the rotation of the text to be exposed is made easier, and the operation is simplified for personnel who have to operate the area exposure apparatus and the further processing of the text produced by it.

In accordance with a more specific aspect, use is made, in connection with the converter, of a common output data processing system, wherein an X register for the storage of X distance data and a Y register for the storage of Y distance data is provided. The rotation Y distance data and rotation X distance data fed from the converter to the X register and to the Y register may be then essentially conventionally processed as if X distance data of the position of the character had been fed to the X register and Y distance data of the position of the lines had been fed to the Y register.

The structure and the mode of operation of the converter for the generation of the rotation X distance data and the rotation Y distance data is done by having the converter feed into the X register the rotation Y distance data of a freely selectable distance between one margin, i.e., a typesetting margin $X_{ro}$, of the recording carrier to the next lines rotated about 90°, as well as the distances between the subsequent rotated lines. Further, the converter serves to feed into the Y register the rotation Y distance data between a freely selectable rotation raster including rotation raster lines $Y_{ro}$, $Y_{r1}$, $Y_{r2}$ in the X direction and the side edge, on the left in the normal position, of the rotated character.

While the generation of the rotation X distance data is particularly simple because they correspond to the normal Y distance data, use is made for the generation of the rotation X distance of an additional raster, which is placed over the text column, or its text data, respectively, assumed in the rotated position and therefore, also is referred to as a rotation raster. The rotation raster lines of the rotation raster extend in the X direction as in correspondence with the direction of the scanning movement of the scanner which is controlled, in a conventional manner, by data and signals formed of output data from the output data processing system.

The uppermost rotation raster line has a disance to the uppermost rotated character, or its left side edge, respectively, as from the normal position of the character, which is freely selectable. The rotation raster lines of the rotation raster following in the Y direction, i.e., in the forward move direction of the recording carrier, have constant distance relative to one another. Referring to the rotation raster lines, rotation X distance data are formed to the side edge, the left if it is assumed to be in the normal position, of the rotated character, which in the normal position have almost identical distances to the left side edge of the recording carrier. The rotation raster is preferably applied so that relatively many rotation X distance data may be referred to each rotation raster line, which the rotation X distances do not become too large, and, in case of a given position precision do not require an excessively large rotation of X distance numbers.

Since the area exposure apparatus is to retain its normal function, wherein the characters of the text are exposed in the normal position, i.e., with the scanning movement and the scanning lines extending over the width of the characters, a text decoder is provided as in accordance with which the converter is activated only in predetermined cases. The text decoder according to the invention is, in particular, so designed that it decodes the text data inclusive of the end-of-line commands as well as the width values (widths) of the characters of the text as to whether a given length to width ratio is exceeded. If this ratio is exceeded, the text decoder emits a signal activating the converter so that in this case the text is exposed on the recording carrier, in a position rotated about 90° relative to the normal position.

In still more specific aspects, the text decoder includes an additional logic, which recognizes additional information, which suppress the text rotation while a suitable length to width ratio of the text for rotation can be noted. This additional information includes, in particular, a user command, which can arbitrarily exclude a text rotation, or information pertaining to image data contained in the text, since conventional processing by means of a converter of relatively uncomplicated designed, as described above, and a common output data processing system is not possible in this case.

As a further development in the area exposure apparatus of the invention, a text segmenting device is series-connected to the converter in order to process text columns the length of which exceed the typesetting width. The text segmenting device groups the text data in text segment data, which order a division of the text to be exposed in segments along section lines in the direction of the lines in the X direction should the unsegmented text exceed the typesetting width after rotation. In accordance with another aspect, division by the text segmenting device may be effected while considering additional conditions by which the section lines, along which the text column is segmented, are so transferred that no image rasters, (i.e., structures), which are also termed as tint or frames are cut.

The method aspects of the invention consist of an improvement in the prior art method wherein area exposure of a text is conducted by continuously moving a recording carrier in a forwardly direction which is simultaneously scanned and exposed by means of an intensity modulated scanner beam, i.e., a laser beam, along scanning lines at right angles relative to the feed direction. The scanning lines extend, in each case, over a plurality of characters. The improvement resides in that for exposing the recording carrier with a text exceeding a given length to width ratio and smaller, for a predetermined amount, than the recording carrier, the recording carrier is moved in the direction of the line of the text and is scanned in the direction of the height, i.e., vertical, as opposed to the width, i.e., horizontal, of the characters of the text.

It is assumed in this connection that the typesetting width of the area exposure apparatus employed for exposing the recording carrier corresponds to the width of the recording carrier, i.e., that it is only somewhat narrower than the width of the recording carrier, which includes only very narrow edge areas which are not scanned.

The method of the invention permits a substantial increase in the exposure speed, when text columns are typeset which exceed a given length to width ratio, and have a smaller width than the typesetting width.

In particular, the new method is employed with advantage in cases where the length of the text column exceeds the text width.

It is noted that in the foregoing and the following description, the text length is in some case is also referred to as the text height because it is defined in the direction of the height of the characters.

By employing the method according to the invention, the effective exposure speed, as previously defined, when exposing relatively long but narrow text columns is increased and use of the light-sensitive recording carrier is well made. The method may be employed without changing either the mechanical or the optical portion of an area exposure apparatus used for these purposes. The only changes are, practically speaking, in the electronic components of this area exposure apparatus. These changes are not extensive either, as has been shown in connection with the area exposure apparatus.

BRIEF DESCRIPTION OF THE DRAWINGS

In the following, the invention will be explained in more detail based on the drawings including six figures wherein.

DETAILED DESCRIPTION OF THE INVENTION

Figure 1:
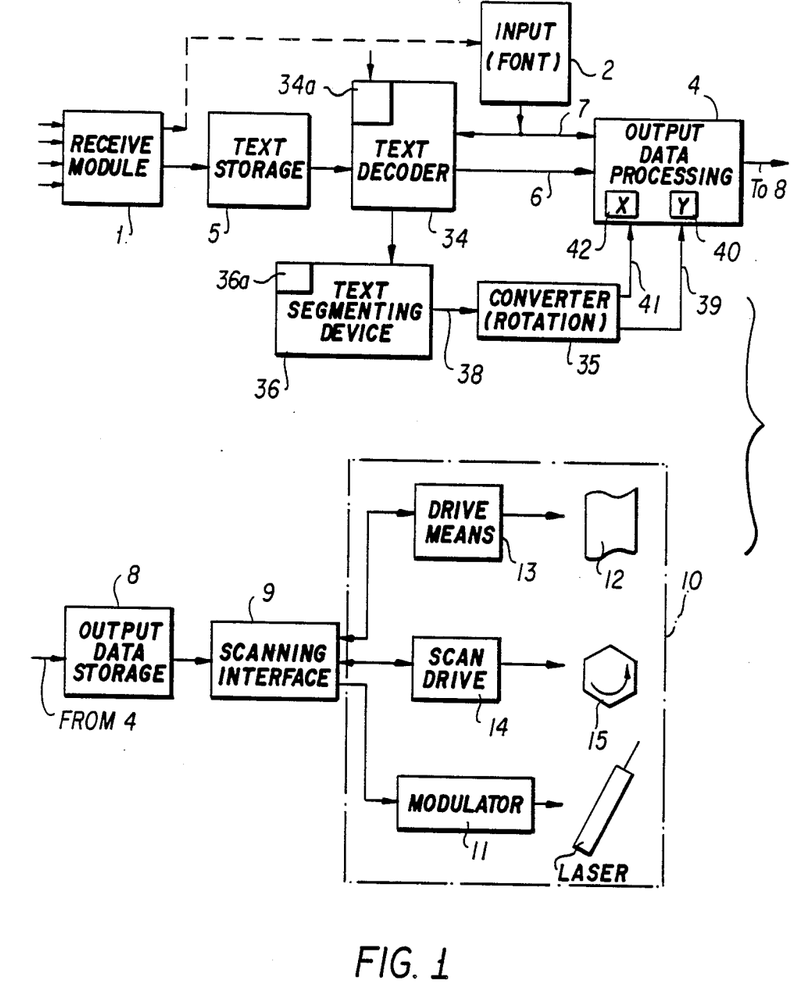
FIG. 1 is a schematic diagram depicting essential process modules of the area exposure apparatus in a simplified block diagram.

In accordance with FIG. 1, reference numeral 1 designates a receive module for receiving text data from a plurality of serial interfaces indicated by input unnumbered arrows. The text data define the identity, position, kind (font number), and the size of the character as well as the typesetting commands, particularly end-of-line commands. The text data may be provided by input devices not shown, particularly other computer systems or storage media, such as floppy discs. Details in connection with the text data and the input means thereof may be taken from German Patent Specification No. 2,940,897 (U.S. Pat. No. 4,231,096) which disclosures are specifically incorporated by reference herein. The input means may also include an input terminal including a keyboard and a monitor, e.g., a conventional CRT display, or a data transfer channel such as a telephone line.

The area exposure apparatus also includes an input device 2 for character-specific data. As character-specific data particularly, such data are considered to be data which defines the contour or circumference lines of each character of a font as well as width values, (widths), of the corresponding character. Further details relative to the character-specific data may be taken from German Patent Specification No. 2,940,897 which disclosure is specifically incorporated by reference herein. Input devices for character-specific data constitute the state of the art, are conventional and well known, and are, in particular, referred to as "font handler" devices. The input device may receive the character-specific data from font store means which may, in particular, take the form of a floppy disc. To this end, the input device, i.e., font handler, may be connected to drive means not shown in FIG. 1. It is, however, also possible for the input means to receive the character-specific data from receive module 1 as indicated by the broken line 3 in FIG. 1.

An essential constituent of a common area exposure apparatus is an output data processing system referred to, in FIG. 1, by the number 4. The output data processing system is fed, from receive module 1, with the text data through a text storage 5 in which the text data of various serially-fed typesetting jobs are orderly stored. Through an input 6, the text data arrive in output data processing system 4. The output data processing system also receives character-specific data from input device 2 through an input 7.

Common output data systems generate, from the text data and the character-specific data, output data which are suited for controlling a modulator of the scanner beam, the deflection movement of the scanner as well as that of the drive means. From the output data, video signals may, in particular, be obtained by means of which a laser beam is switched on or off, or is intensity-modulated, respectively, as a scanner beam.

The structure of an output data processing system and the operation thereof have in detail been described in German Patent Specification No. 2,940,897 which disclosure is specifically incorporated by reference herein. In accordance with this prior patent specification, from the text data and the character-specific data, also referred to as first and second digital data, so-called third digital data are generated as output data in a manner known from the prior art. The output data processing system includes, in particular, a processor and data storage medium. The output data processing system may be designed to include a data management subsystem which provides data for a contour conversation subsystem in order to facilitate rapid processing of the offered data by means of the contour converting system. The contour converting system particularly, converts stored outline or contour data, i.e., character-specific data, while considering the text data, into horizontal stroke data for the laser scanner. The horizontal stroke data constitute image point data as essential output data. These devices are conventional and well known to those of ordinary skill in this art.

In order to develop the horizontal stroke data, the contour converting system is of the type capable of performing, in particular, the following process steps:

(a) Read data which identify one text line and its size.

(b) Read the distance from the typesetting margin of the recording carrier to the left side edge of the first character, and store in an X register.

(c) Read character-specific data for the next character and convert the distance from the left character edge to the contour.

(d) Output the sum of the value formed in the foregoing and of a current X value on a raster line buffer.

(e) Read the following contour and repeat the step for the conversion of the distance from the left character edge of the contour until all contours on one height of the line have been calculated.

(f) Read the distance to the left character edge of the next character and feed to the X register.

(g) Repeat steps (c)–(f) until all the characters on one height of the line are calculated.

(h) Transfer the output data, image point data, for example, for a raster scanner, to an output data storage.

In FIG. 1, the output data storage is referred to by 8. In addition to the X register, output data processing system 4 includes a Y register in which data may be fed corresponding in the Y direction to the height of the scanning lines, or to the character distances, in the Y direction, respectively.

Output data storage 8, which receives the output data, particularly the image point data, along scanning lines, is connected, through a scanner interface 9, to a laser scanner 10. Scanner interface 9 is controlled by output data system 4 and by laser scanner 10 so that the image point data are converted into video control signals for the modulation of light modulator 11 in the laser scanner by which image points on recorder scanner 12 are modulated. In addition, scanner interface 9 emits control signals for starting drive means 13 of the recording carrier. The scanner interface is also connected to a scanner drive mechanism 14 for a scanner polygon mirror 15 in order to synchronize the rotation speed of the polygon mirror 15 to the drive means of the recording carrier.

Figure 4:
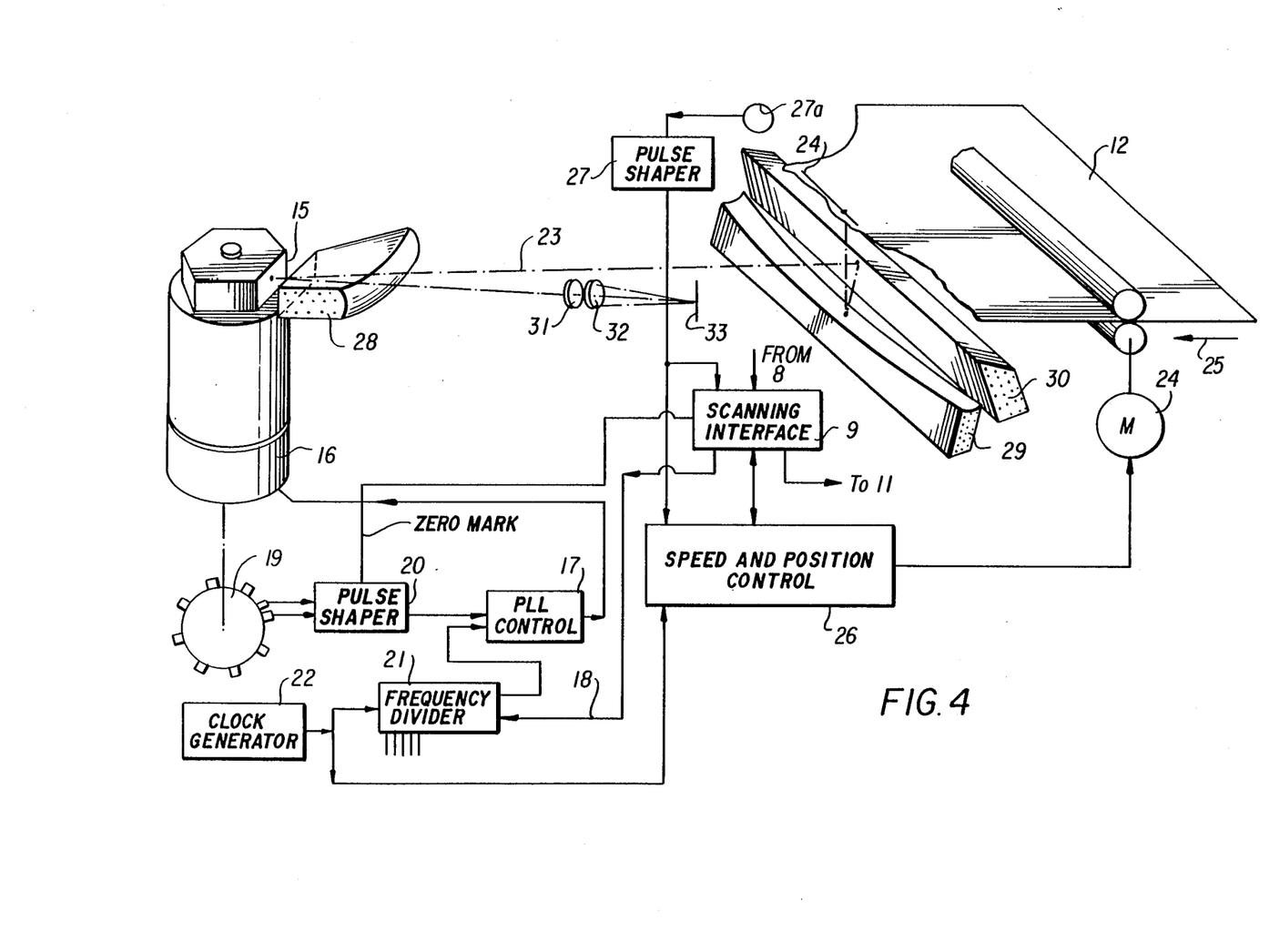
FIG. 4 is a representation of the scanner of the area exposure apparatus.

In FIG. 4, the laser scanner, developed as a flat bed deflection system, is shown in more detail. It is clear that the polygon mirror 15 is driven by motor 16 which is fed from a phase locked loop, i.e., PLL control 17. A PLL control is conventional and well known to those of ordinary skill in the art.

The PLL control serves to control the drive speed of the polygon mirror 15. To this end, rotation angle pulses from a rotation angle pulse generator 19 are fed to motor 16 through a pulse shaper 20 into an actual value input of the PLL control 17. A nominal value input of this control is fed by pulses from an adjustable frequency divider 21 deducted from a frequency generator 22. Depending on the adjustment of the frequency divider, the PLL control controls a constant speed of motor 19 and of the polygon mirror 15, which deflects a scanner beam, or beam bundle 23, over a scanning line 24. At the same time, the recording carrier 12 may be transported by means of a stepping motor 24 having a constant speed in the forward move direction. Speed and position control means, generally referred to by 26, feeds a pulse stream of constant pulse frequency generated by frequency generator or clock-pulse generator 22 into stepping motor 24. The motion of motor 16 driving the polygon mirror is therefore synchronized with the forward movement effected by stepping motor 24. In addition for synchronizing, a reference signal SOL from a pulse shaper 27 is employed, which is connected to a light sensitive element 27a picking up a determined position of scanner beam 23 on the recording carrier.

The laser scanner also includes an optical system consisting essentially of an aplanatic unit lens 28, a field flattening mirror 29, a deflection line mirror 30 as well as an objective lens 31 and a dispersion lens 32 which expose a character projected into an intermediate image level 33, i.e. image points of the character on recording carrier 12.

Figure 5:
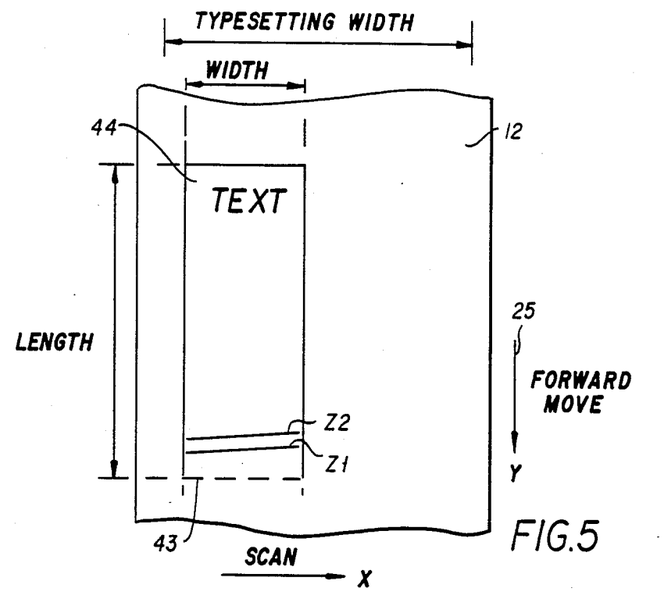
FIG. 5 depicts a section of the recording carrier conventionally exposed by the area exposure apparatus.

As shown in FIG. 5, by projecting the deflection movement of the polygon mirror onto recording carrier 12, the latter may be scanned over the typesetting width and be image-wise exposed over the width of a text. The scanning lines have in this connection been referred to by Z1 and Z2. The scanning lines extend straight and at a constant distance relative to each other, approximately at right angles to the forward move direction. (The slight inclination of the scanning lines is caused by the finite scanning speed relative to the forward move speed of the recording carrier). The forward move direction of the recording carrier is in the Y direction while the scanning movement is effected at right angles relative thereto.

From FIG. 5 it can be seen that in case of conventional scanning of the recording carrier, the latter is moved forward at right angles relative to the direction of the line of the text, and at the same time is scanned in the direction of width of the character, i.e., in the text line direction. When, as shown in the Figures, text columns are exposed an amount the width of which is relatively small with respect to the typesetting width, which extends over the total suitable area of the recording carrier at right angles relative to the transport direction, a relatively large area of the recording carrier remains unused. In addition, a result is that the effective exposure speed is relatively small considering that deflection of the possible image locations of the scanning beam is constantly performed over the typesetting width, but is only image-wise exposed during the course of the relatively short scanning line sections. Thus, there is a great waste of motion.

Figure 6:
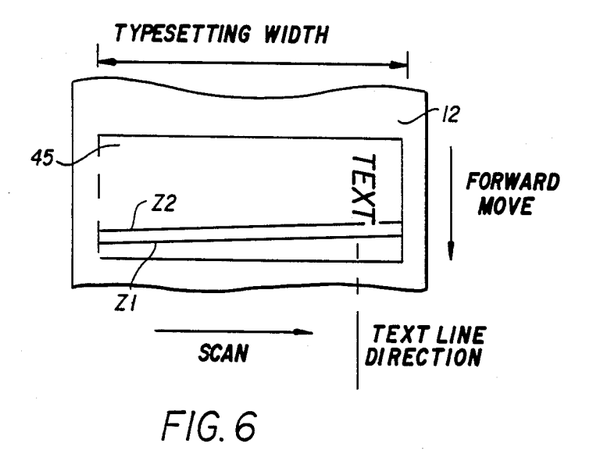
FIG. 6 shows one section of the recording carrier, exposed in accordance with the new method with the text of a text column rotated about 90° relative to the normal position.

In order to avoid these disadvantages, the text being scanned is rotated, relative to the normal position, as shown in FIG. 5, about 90° into the position shown in FIG. 6. To this end, the area exposure apparatus described includes the components described hereinafter.

Following text storage 5, a text decoder 34 is provided, which feeds the text data from the text storage either directly to input 6 or output data processing system 4, or to a converter 35. Between the corresponding output of the text decoder and the input of the coverter 35, a text segmenting device 36 may be inserted.

The text data of the text to be exposed from text storage 5 are fed to the text decoder 34, and so are the character-specific data which include the widths of the characters to be exposed, from output device 2 for character-specific data. By means of these data, it is determined whether the text to be exposed exceeds a given length to width ratio and falls below the given typesetting width for a given measure. If these criteria are met, converter 35 is activated by means of an output signal of the text decoder for the rotation of the text to be exposed about 90° relative to a normal position of the text on the recording carrier. The text decoder includes an additional logic 34a, to which additional information can be fed which can serve to prevent automatic rotation when rotation criteria is met, of the text. To this end, a user command may, in particular, be fed to an input 37 of the text decoder. Information on the image data continued in the text, excluding rotation of the text to be typeset as well, may be obtained from the text data.

The activated converter receives at its input 38 text data and character-specific data, from which data transformed by the design of the converter are generated, causing, in case of normal processing of the converted data in the output data processing system, rotation of the text to be exposed about 90° relative to its normal position. These transformed data are also referred to as rotation X distance data as well as rotation Y distance data.

Figure 2:
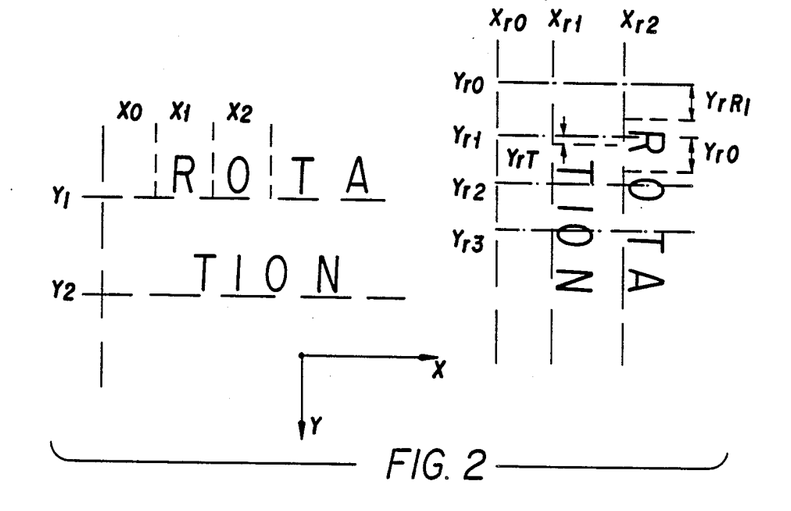
FIG. 2 illustrates a representation of the text rotation to explain the converter of the area exposure apparatus.

In order to explain the design and the function of the converter, reference is made in the following to FIG. 2. In accordance with this figure, the converter is fed with text data and character-specific data which yield, when exposing in the normal position of the text one text column, which begins as shown in the left portion of FIG. 2, but contains in addition short lines. The height of the lines, or the base lines of the characters on the lines, respectively, is in this case referred to by $Y_1$, $Y_2$. The line heights form a portion of the Y distance data which mark positions of scanning lines in the Y direction. Corresponding X distance data in the X direction referred to by $X_0$, $X_1$ and $X_2$, include distances between a left typesetting margin of the recording carrier and the left side edge of the first character, or include the width values, i.e., (widths), of the subsequent characters which follow immediately after each preceding character.

The converter transforms the Y distance data $Y_1$, $Y_2$ as described into rotation X distance data, which may be referred to the left typesetting margin as well as has been shown in the right-hand portion for a text rotation about 90° relative to the normal position. The distance between the rotation X distance data $X_{r1}$ and $X_{r2}$ corresponds to the line distance between $Y_1$ and $Y_2$ in the text in the normal position.

For the formation of the rotation Y distance data of the text rotated about 90°, the latter is superposed on a rotation raster having rotation raster lines $Y_{r0}$, $Y_{r1}$, $Y_{r2}$, et seq. The rotation raster lines extend in this case in the X direction. Between the uppermost rotation raster line $Y_{r0}$ and the side edge, left in the normal position, of the first character, which follows in the Y direction, i.e., R, the rotation Y distance data $Y_{rR}$ is determined. The corresponding distances $Y_{rT}$ and $Y_{r0}$ of the following characters are referred to the rotation raster lines $Y_{r1}$. Generally, on each rotation raster line as many character distances as possible are referred to, on $Y_{r1}$, for instance, the distances of the two characters T and 0.

Based on the transformation as described, the text data and the character-specific data are provided by converter 35 in the following form:

| R | $Y_{rR}$ | | |
| T | $Y_{rT}$ | O | $Y_{rO}$ |

The last-described data inclusive of the rotation Y data are fed through a line 39, from the converter to Y register 40 in the output data processing system. The rotation X distance data is passed through a line 41 to X register 42 in the output data processing system.

In the output data processing system, the data stored in the X register and in the Y register may in a conventional manner constitute the base for further function and computing process.

As concerns the reference lines provided in converter 35 for the transformation of data into the data of the rotated text, it should be noted that the left side edge or the left typesetting margin $X_{r0}$ are identical to the normal left typesetting margin $X_0$, and that the rotation X distance data $X_{x1}$ may be freely selected.

In the rotation raster formed in converter 35, the position of the uppermost rotation raster line $Y_{r0}$ may be freely selected to be followed at constant distances by the rotation raster lines which follow in sequence.

If the length of a text column to be rotated does not exceed the typesetting width of the recording carrier, the character data and the character-specific data of this text can be transformed directly. If, on the other hand, the length of the text to be rotated exceeds the typesetting width, the text data and the text-specific data are first divided into segments in a text segmenting device arranged before the converter so that the segments to be exposed, rotated within the converter, occupy the complete typesetting width without exceeding it.

To accomplish this the text segmenting device includes in storage comparison criteria of the typesetting width and of the length of the text to be typeset. As for the rest, this text segmenting device operates, in principle, similar to prior art text segmenting devices, in which however, the text is split up for the side-by-side arrangement of the segments.

In addition to the above, the present text segmenting device includes a logic 36a, which excludes segmentation of the text along section lines intersecting image rasters, i.e., structures or frames, and displaces segmentation into locations of the text wherein such image rasters or frames do not occur. This is a deviation from the criteria mentioned in the beginning that the text segments extend over the entire typesetting width. A section line, along which the text exceeding a given length corresponding to the typesetting width is segmented, is shown in FIG. 5 by a broken line and referred to by 43.

FIG. 5 illustrates how a text column 44 is exposed, in a conventional manner, by means of the area exposure apparatus, on the recording carrier 12, if no rotation of the text is performed. The scanning movement goes in the direction of the lines, or the other words, in the direction of the width of the characters. The recording carrier is transported, at right angles relative thereto, in a forward move direction 25. From FIG. 5 it can be seen that in the right portion of the recording carrier, a relatively large area remains free which is not exposed by scanning lines Z1 and Z2.

As compared thereto, FIG. 6 shows how the text rotated about 90° relative to the normal position fills up the typesetting width of the recording carrier. Above rotated text column 45, as shown, further rotated text columns, or non-rotated text, respectively, may be exposed making extensive use of the total area of the recording carrier.

FIG. 6 clearly illustrates the process for the area exposure by which the recording carrier is moved forward in the direction of the lines of the text while, at the same time, the recording carrier is scanned in the direction of the height of the text so that scanning lines Z1 and Z2 extend over the length of the text or a text segment, respectively. The forward move direction is in the direction of the width of the text, or of the characters forming the text.

Figure 3:
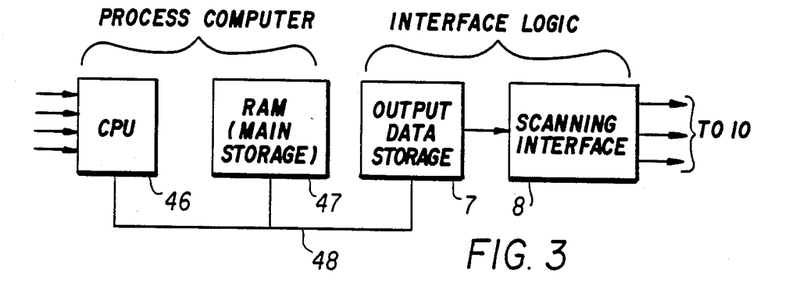
FIG. 3 is a rough schematic diagram of an embodiment of the electronic portion of the area exposure apparatus according to FIG. 1 which was previously shown therein in block diagram.

In FIG. 3, a hardware embodiment of a portion of the area exposure apparatus is shown.

A central processor unit 46 including serial channels, a main storage 47, embodied as a RAM, i.e., random access memory, as well as output data storage 7, as compared FIG. 1, are in data-exchange connection through a system bus 48. Central processor 46 and the main storage constitute a process computer comprised, in accordance with its virtual structure, the process modules, as described, of receive module 1, of text storage 5, of text decoder 34, of converter 35, of text segmenting device 36 and of output data processing system 4. Output data storage 7, and the scanning interface connected thereto, constitute the laser scanner interface logic entering into data exchange with the drive means and the scanner drive and delivering video control data to the modulator, compare FIG. 1. Drive means 13 of FIG. 1 corresponds to motor 24 and speed and position control 26 of FIG. 4.

What is claimed is:

1. In an area exposure apparatus for exposing area of a text on a recoding carrier, an apparatus of the type comprising drive means for continuously moving said recording carrier in a forward move direction, a scanner for scanning said recording carrier at right angles relative to said forward move direction by means of a modulated scanner beam, the scanning movement of which is coupled to said drive means, and further comprising a receive module for receiving text data defining the identity, position, kind and size of the characters, said text data including end-of-line commands, an output data processing system connected to said receive module and an input device for receiving character-specific data defining the contour of the character, said output data processing system constructed for generating output data for controlling said scanner, and further comprising a converter connected to said output data processing system for converting said text data of text which is relatively narrow compared to a given typesetting width of said area exposure apparatus, the improvement wherein said output data processing system (4) comprises an X register (42) for storing X distance data of the postions of the characters in the X direction, and a Y register (40) for storing Y distance data of the positions of the scanning lines in the Y direction, for exposing the text in the normal position, a converter of the type for converting the X distance data of the characters of the text in rotation Y distance data as well as the Y distance data of the lines of text in rotation X distance data for rotating the text to be exposed onto said recording carrier about 90 degrees relative to a normal position of the text on said recording carrier, and at least one output (39 or 41) of said converter connected to said X register (42) and to said Y register (40).

2. An area exposure apparatus according to claim 1 wherein said converter (35) is for feeding into said X register (42) rotation X distance data of a freely selectable distance between one typesetting margin $X_{r0}$ of said recording carrier (12) to the next lines rotated about 90°, and the distances between the subsequent rotated lines, and said converter being for feeding into said Y register (40) the rotation Y distance data between a freely selectable rotation raster including rotation raster lines ($Y_{r0}$, $Y_{r1}$, $Y_{r2}$) in the X direction, and the side edge of the rotated character.

3. An area exposure apparatus according to claim 1 wherein a text decoder (34) is provided, for feeding text data, including end-of-line commands and width values of characters of text, and for, when decoding text exceeding a given length to width ratio and falling short of the typesetting width of the carrier, activating said converter (35) for rotating the text.

4. An area exposure apparatus according to claim 2 wherein a text decoder (34) is provided, for feeding text data, including end-of-line commands and width values of characters of text, and for, when decoding text exceeding a given length to width ratio and falling short of the typesetting width of the carrier, activating said converter (35) for rotating the text.

5. An area exposure apparatus according to claim 3 further comprising additional logic (43a) in said text decoder (34), for recognizing additional informations fed into said text decoder for excluding text rotation and for suppressing an output signal activating said converter.

6. An area exposure apparatus according to claim 4 further comprising additional logic (43a) in said text decoder (34), for recognizing additional informations fed into said text decoder for excluding text rotation and for suppressing an output signal activating said converter.

7. An area exposure apparatus according to claim 1 further comprising a text segmenting device (36) series-connected to said decoder (34) for grouping text data into text segment data for commanding a division of the text to be exposed in segments along intersection lines (43) in the direction of the lines in the X direction in the event unsegmented text exceed the typing width after rotation.

8. An area exposure apparatus according to claim 7 wherein said text segmenting device (36) further comprises a logic (36a) for excluding segmenting of the text along intersection lines intersecting with image rasters or frames.

9. A method for conducting a real exposure of text on an area of a recording carrier continuously moved in a forward move direction which is simultaneously scanned and exposed by means of an intensity-modulated scanner beam, along scanning lines at right angles relative to the feed direction of the carrier, said scanning lines extending in each case over a plurality of characters, the method comprising, for exposing said recording carrier with a text exceeding a given length to width ratio and a predetermined smaller width than the recording carrier, scanning said recording carrier (12), which is moved in the line direction of the text, in the direction of the height of the characters of the text.

10. A method according to claim 9 wherein in the case of a given length to width ration of the text, the length of the text exceeds the width of the text.

* * * * *